US008595326B2

(12) United States Patent
Flinchem

(10) Patent No.: US 8,595,326 B2
(45) Date of Patent: Nov. 26, 2013

(54) AUDIO USER-INTERFACE

(75) Inventor: Edward P. Flinchem, Seattle, WA (US)

(73) Assignee: Integic Technologies LLC, Wilmington, DE (US)

( * ) Notice: Subject to any disclaimer, the term of this patent is extended or adjusted under 35 U.S.C. 154(b) by 1904 days.

(21) Appl. No.: 11/613,817

(22) Filed: Dec. 20, 2006

(65) Prior Publication Data
US 2007/0150831 A1 Jun. 28, 2007

Related U.S. Application Data

(60) Provisional application No. 60/752,421, filed on Dec. 21, 2005.

(51) Int. Cl.
*G06F 15/16* (2006.01)
(52) U.S. Cl.
USPC .......................................................... 709/219
(58) Field of Classification Search
USPC ......... 709/220, 201, 219, 217, 218, 249, 238, 709/232, 224, 226, 203, 245; 707/501, 505, 707/506, 530, 513; 715/215, 735, 736, 740; 370/230, 231, 232, 352, 389, 229, 254, 370/360; 705/5, 6, 1, 28, 26, 27, 56, 35, 37, 705/44, 10, 14, 30, 7; 725/40, 39, 37, 32, 725/22, 74–85
See application file for complete search history.

(56) References Cited

U.S. PATENT DOCUMENTS

| | | | |
|---|---|---|---|
| 2002/0082901 A1* | 6/2002 | Dunning et al. | 705/10 |
| 2002/0092019 A1* | 7/2002 | Marcus | 725/37 |
| 2005/0050406 A1* | 3/2005 | Hsu | 714/701 |
| 2005/0144636 A1* | 6/2005 | Hirai | 725/35 |

* cited by examiner

*Primary Examiner* — Benjamin R Bruckart
*Assistant Examiner* — Mark O Afolabi

(57) ABSTRACT

Methods and systems for scrolling through content of media. An example method performed on a cell phone receives an index of segments from a server over a cellular network and a public data network. The received segment is presented based on the received index of segments. A request for a media file associated with the presented segment is generated and sent, if a user selection signal is received. The index of segments includes information that associates a preselected segment of a full media file with the full media file. A request for a segment associated with the received index of segments to the server is generated and sent and the requested segment is received from the server based on the request before presenting. The requested media file is received and presented after the server processes the request for the media file.

28 Claims, 4 Drawing Sheets

AUDIO USER-INTERFACE

PRIORITY CLAIM

This invention claims the benefit of U.S. Provisional Application Ser. No. 60/752,421 filed on Dec. 21, 2005, the contents of which are hereby incorporated by reference.

BACKGROUND OF THE INVENTION

There presently exists usability problems on a cell phone. The small screen size limits the number of viewable content options. The textual metadata is not always an adequate descriptor of the content (e.g. "hurricane report" might be about a storm or a basketball game). Longer textual descriptors suffer from the problem of limited screen size. Also, it takes a long time to download content for preview. Even short previews require multiple steps. Progressive download alleviates but does not remove the need to navigate to each piece of content in order to preview it.

Therefore, there exists a need for an improved user interface for use with small screen systems.

SUMMARY OF THE INVENTION

The present invention provides methods and systems for scrolling through content of media. An example method performed on a cell phone or similar device receives an index of segments from a server over a cellular network and a public data network. The received segment is presented based on the received index of segments. A request for a media file associated with the presented segment is generated and sent, if a user selection signal is received.

The index of segments includes information that associates a preselected segment of a full media file with the full media file.

A request for a segment associated with the received index of segments to the server is generated and sent and the requested segment is received from the server based on the request before presenting.

The requested media file is received and presented after the server processes the request for the media file.

A next segment is presented after the previous segment has been presented and no user selection signal was received. A download of a media file associated with the presented next segment is requested, if a user selection signal is received.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

The present invention provides methods and systems for increasing the usability of audio content presented on a mobile wireless device or similar device. Representative sections of the audio from the top n tracks or podcast episodes are selected by hand, or automatically using an algorithm (e.g. first 15 seconds, or first 5-20 seconds).

The present invention includes components for concatenating audio samples into one "sample file." Audible breaks are inserted between the samples (e.g. a tone, a piece of music, or white noise). The user chooses the sample file, which is downloaded, either as a whole or as a progressive download. The sample file is played. When the user hears content they like, they activate a "select" button. Activation of the "select" button identifies the presently playing sample, connects it back to its original content and begins the download of the original content to the device.

Figure 1:
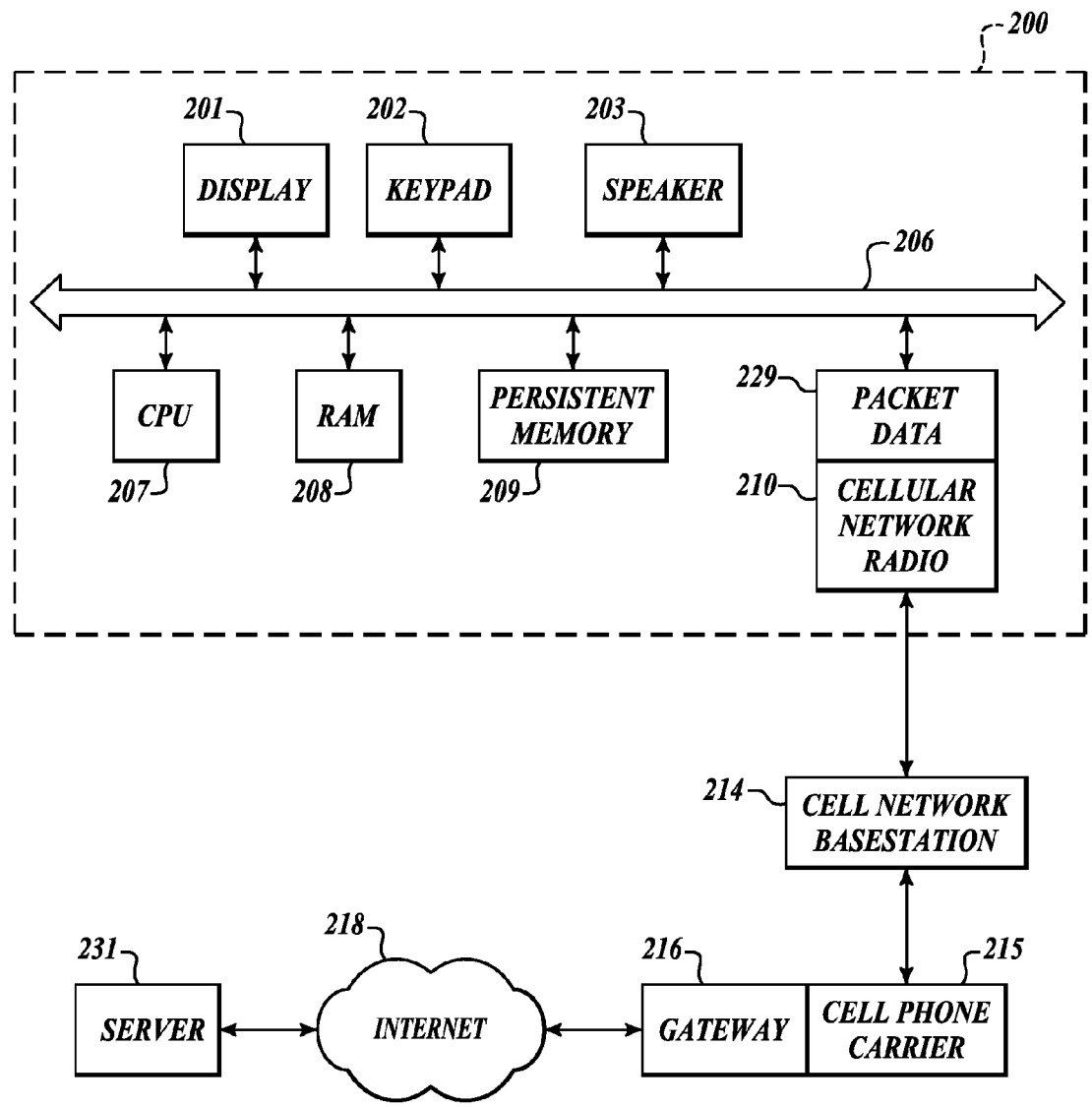
FIG. 1 is a schematic diagram of an example system formed in accordance with the present invention.

FIG. 1 shows a user device 200, such as a mobile phone, having a processor 207, random access memory 208, persistent memory 209 (which could be rewriteable FLASH memory), a display 201, a keypad 202, one or more speakers 203, and a cellular network radio data communication component 210. A data bus 206 connects the various elements within the device 200.

The radio component 210 allows data communications with a public or private data network 218, such as the Internet, via cellular wireless voice and data network base stations 214, associated mobile phone carrier 215 and a gateway 216. The radio component 210 sends and receives a variety of packet data 229 according to a predefined protocol (UDP, TCP, SMTP, HTTP, etc) through the data network 218.

Connected to the data network 218 is a server 231 or group of servers that enable the download of open or protected (encrypted) digital media files to the device 200 and digital content keys to unlock the protected content for use on the device 200 that are properly authenticated. The processor 207 executes previously stored client software that performs the process described below.

Figure 2:
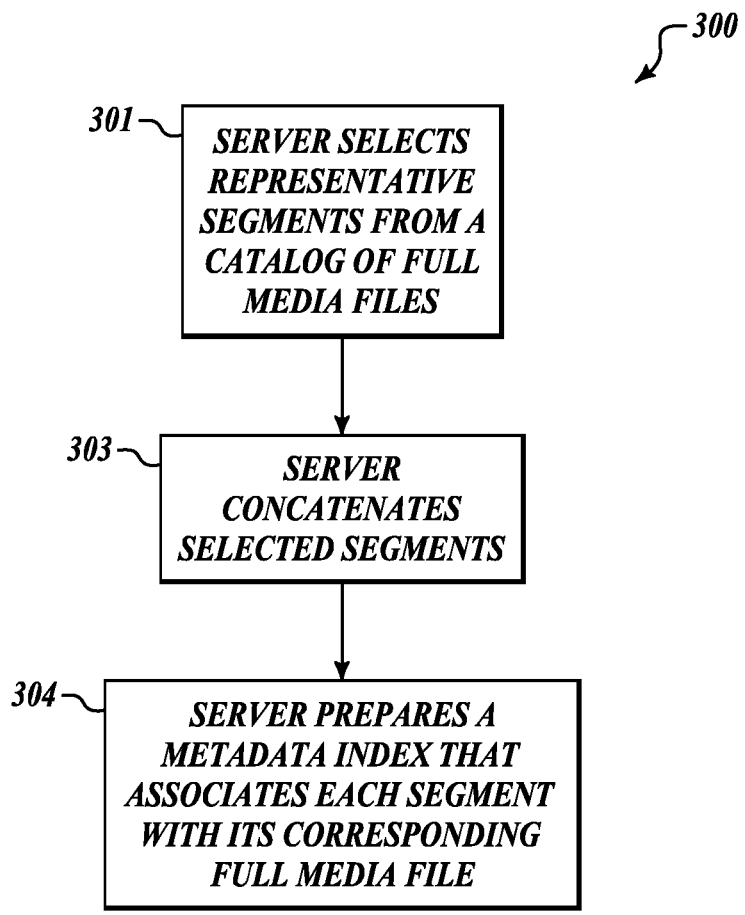
FIGS. 2 and 3 illustrate flow diagrams of example processes performed by components of the system of FIG. 1.

FIG. 2 illustrates a flowchart of an example process 300 performed by the components in FIG. 1. At block 301, the server 231 selects representative segments from a catalog of media files. At block 303, the server 231 concatenates the selected segments. At block 304, the server 231 prepares a metadata index that associates each segment with an associated full digital content (media) file.

Figure 3:
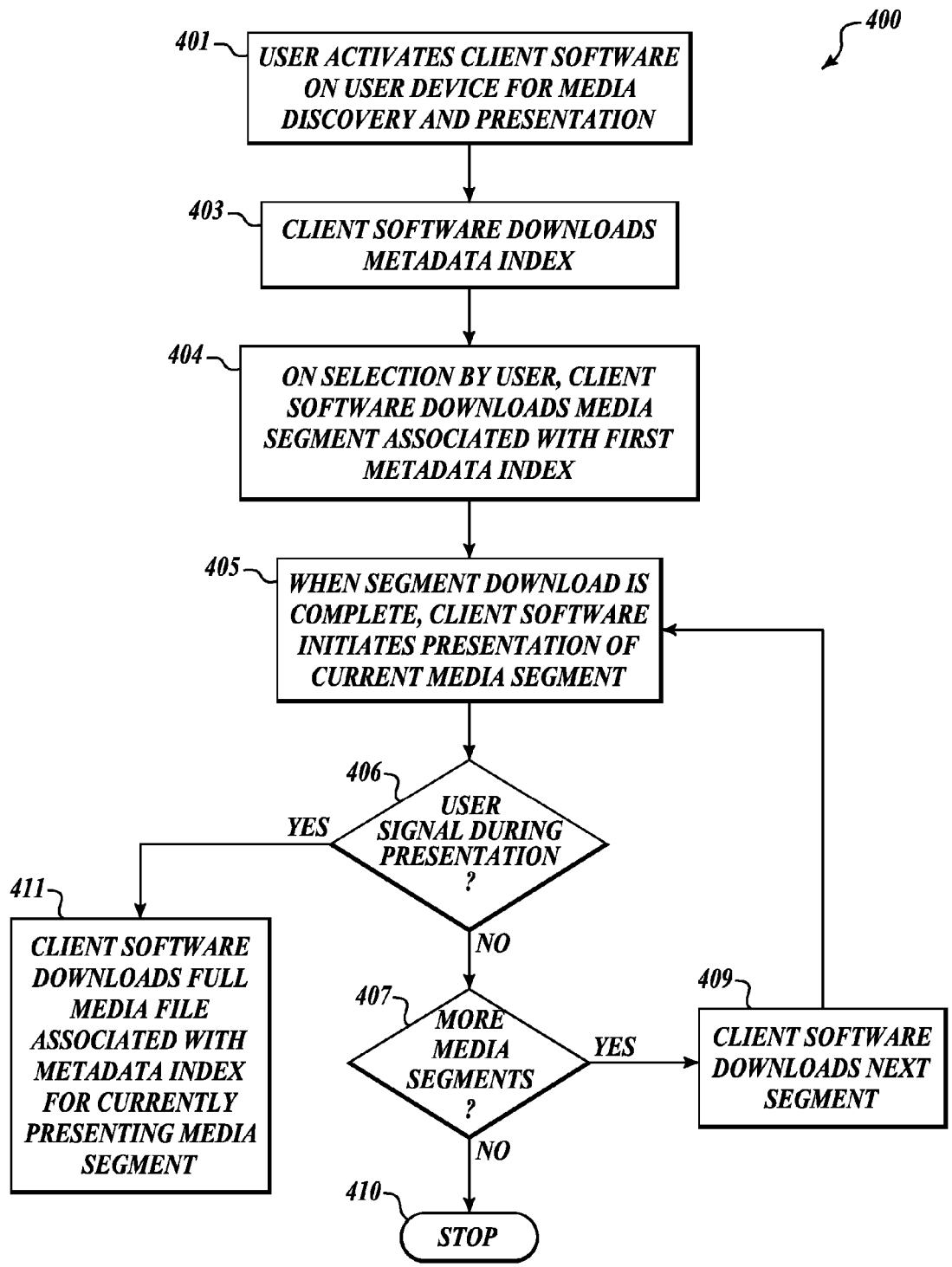

FIG. 3 is a flowchart of an example process 400. At block 401, a user activates client software on the user device 200 for media discovery and presentation. At block 402, the client software downloads the previously created metadata index (see FIG. 2) based on the user activation. At block 404, upon selection by the user, the client software downloads one of the media segments associated with the downloaded metadata index.

At block 405, when the media segment has been downloaded, the client software initiates audible presentation of the downloaded media segment. The media segments may be presented as an audible presentation through the speaker 203 or as a selection list presented on the display 201. At decision block 406, the processor 207 determines if a user signal is activated during audible presentation of the media segment. The user signal may be generated by activation of a selection key on the user device 200 during the audible presentation, activating a cursor on the display 201, or by any other user interface selection technique. When the user makes a selection during presentation of the segment, at block 411, the client software downloads the full media file associated with the currently presented segment based on the metadata index.

If no user signal is activated, then, at block 407, the processor 207 determines if more media segments are available for delivery. At block 409, if there are more segments, the client software downloads the next segment and the process 400 returns to block 405. If no more segments are present, the process 400 stops, block 410.

In one embodiment, the concatenated segments are downloaded when the metadata index is downloaded. Thus, the segments are presented in order and when a user makes a selection during presentation of the current segment, at block 411, the client software downloads the full media file associated with the currently presented segment based on the metadata index.

Figure 4A:
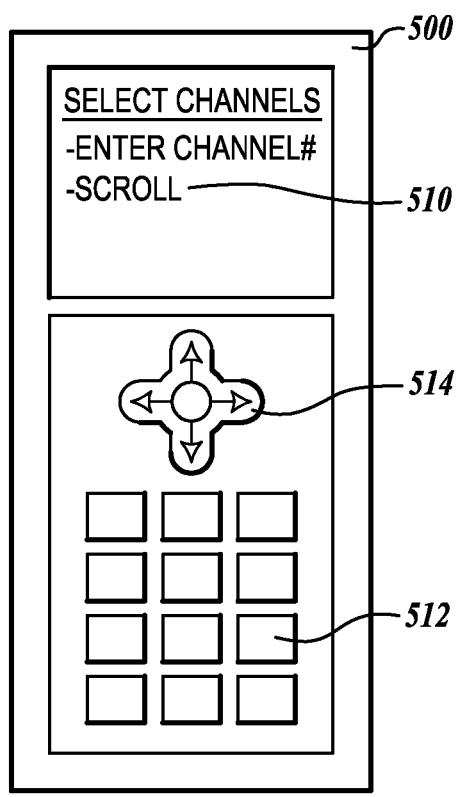
FIGS. 4A and B illustrate example user interfaces on devices formed in accordance with the present invention.
Figure 4B:
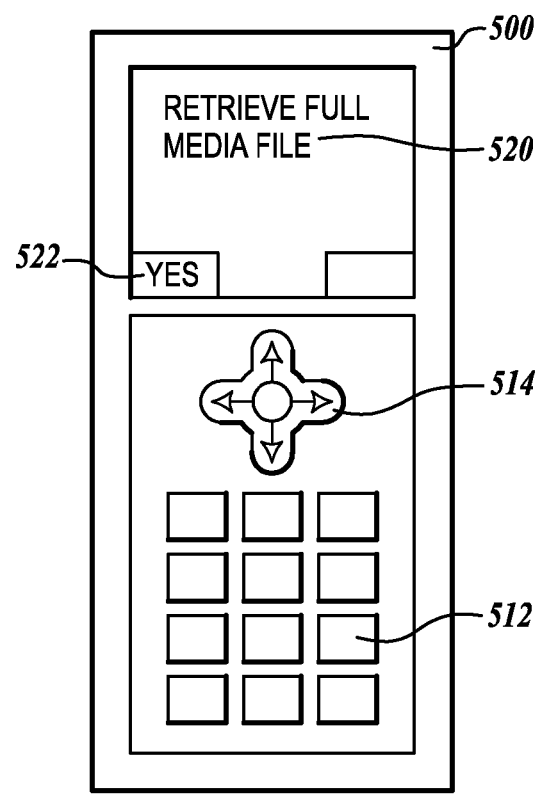

FIG. 4A is a front view of a cell phone 500 that performs the process shown in the FIG. 3. After the phone 500 is activated, an index file is received from a server via the network 218 and the cellular system. Then, the phone 500 allows a user the option of selecting a scroll option 510. After the user selects the scroll option 510 using a keyboard 512, a knob 514 or some other type of user interface, the phone 500 downloads a first media segment from the server or some other source and presents the segment once downloading is complete (or presents after buffering the segment). While the first media segment is being presented (e.g., user is listening to the segment), the phone 500 allows a user the option of selecting the full media file that is associated with the presented segment, see FIG. 4B. The user may select the full media file by activating a displayed prompt 520 or key associated prompt 522.

Also, a next button (not shown) may be presented while the first media segment is being presented. If the user activates the next button, the phone immediately downloads and presents the following media segment and does not wait for the first media segment to complete.

While the preferred embodiment of the invention has been illustrated and described, as noted above, many changes can be made without departing from the spirit and scope of the invention. For example, downloading of a media segment may occur at any time relative to the presentation of a preceding media segment. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
receiving an index at a mobile communication device, wherein the index associates a plurality of content segments with a corresponding plurality of full content files;
receiving a first content segment of the plurality of content segments, wherein the first content segment corresponds to a first full content file;
presenting the first content segment;
receiving a selection of the first content segment; and
transmitting a request for the first full content file, wherein the request is generated based at least in part on the selection of the first content segment and at least in part on the index.

2. The method of claim 1, further comprising receiving the first full content file at the mobile communication device.

3. The method of claim 1, wherein the first full content file corresponds to a song.

4. The method of claim 3, wherein the first content segment comprises a representative section of the song, wherein the representative section is between five seconds and twenty seconds in length.

5. The method of claim 1, wherein receiving the first content segment comprises receiving a sample file that includes the plurality of content segments.

6. The method of claim 5, wherein the sample file includes an audible break between each of the plurality of content segments.

7. The method of claim 6, wherein the audible break comprises at least one of a tone, a piece of music, or white noise.

8. The method of claim 1, wherein the selection of the first content segment is received while the first content segment is being presented.

9. The method of claim 1, wherein the first content segment is presented as part of a selection list on a display of the mobile communication device.

10. A mobile communication device comprising:
a processor;
a radio component operatively coupled to the processor, wherein the radio component is configured to
receive an index, wherein the index associates a plurality of content segments with a corresponding plurality of full content files; and
receive a first content segment of the plurality of content segments, wherein the first content segment corresponds to a first full content file;
an output operatively coupled to the processor, wherein the output is configured to present the first content segment;
an interface configured to receive a selection of the first content segment; and
wherein the radio component is further configured to transmit a request for the first full content file, wherein the request is generated based at least in part on the selection of the first content segment and at least in part on the index.

11. The mobile communication device of claim 10, wherein the first full content file corresponds to a song.

12. The mobile communication device of claim 10, wherein the first content segment is received as part of a sample file that includes the plurality of content segments.

13. The mobile communication device of claim 12, wherein the sample file includes an audible break between each of the plurality of content segments.

14. The mobile communication device of claim 13, wherein the audible break comprises a tone.

15. The mobile communication device of claim 10, wherein the radio component is further configured to transmit a request for the index to a server.

16. A non-transitory computer-readable medium having stored thereon, computer-executable instructions which, when executed by a processing device, configure the processing device to:
receive an index, wherein the index associates a plurality of content segments with a corresponding plurality of full content file;
receive a first content segment of the plurality of content segments,
wherein the first content segment corresponds to a first full content file;
present the first content segment; receive a selection of the first content segment; and transmit a request for the first full content file, wherein the request is generated based at least in part on the selection of the first content segment and at least in part on the index.

17. The non-transitory computer-readable medium 16, wherein the computer-executable instructions, when executed by the processing device, further configure the processing device to transmit a second request for the index to a server.

18. The non-transitory computer-readable medium 17, wherein the second request for the index is transmitted upon activation of the processing device.

19. The non-transitory computer-readable medium 16, wherein the computer-executable instructions, when executed by the processing device, further configure the processing device to receive the first full content file in response to the request for the first full content file.

20. A method comprising:
providing an index to a mobile communication device, wherein the index associates a plurality of content segments with a corresponding plurality of full content files;
providing a first content segment of the plurality of content segments to the mobile communication device, wherein the first content segment corresponds to a first full content file; and
receiving a request for the first full content file, wherein the request is generated based at least in part on a selection of the first content segment at the mobile communication device.

21. The method of claim 20, further comprising generating a sample file that includes the plurality of content segments.

22. The method of claim 21, wherein providing the first content segment to the mobile communication device comprises providing the sample file to the mobile communication device.

23. The method of claim 22, wherein the sample file and the index are simultaneously provided to the mobile communication device.

24. The method of claim 20, wherein the index is provided to the mobile communication device upon activation of the mobile communication device.

25. The method of claim 20, further comprising receiving a second request for the first content segment from the mobile communication device.

26. The method of claim 20, wherein the selection of the first content segment at the mobile communication device occurs during presentation of the first content segment.

27. The method of claim 20, wherein the request for the first full content file includes an identification of the first full content file from the index provided to the mobile communication device.

28. The method of claim 20, further comprising:
receiving a next command from the mobile communication device; and
providing a second content segment of the plurality of content segments to the mobile communication device in response to the next command.

\* \* \* \* \*

UNITED STATES PATENT AND TRADEMARK OFFICE
CERTIFICATE OF CORRECTION

PATENT NO. : 8,595,326 B2  Page 1 of 1
APPLICATION NO. : 11/613817
DATED : November 26, 2013
INVENTOR(S) : Flinchem It is certified that error appears in the above-identified patent and that said Letters Patent is hereby corrected as shown below:

In the Claims

Column 4, Line 50, in Claim 16, delete "content file;" and insert -- content files; --, therefor.

Column 4, Line 60, in Claim 17, delete "medium 16," and insert -- medium of claim 16, --, therefor.

Column 4, Line 65, in Claim 18, delete "medium 17," and insert -- medium of claim 17, --, therefor.

Column 5, Line 1, in Claim 19, delete "medium 16," and insert -- medium of claim 16, --, therefor.

Signed and Sealed this
Thirteenth Day of May, 2014

Michelle K. Lee
*Deputy Director of the United States Patent and Trademark Office*